United States Patent
Wittmer et al.

(10) Patent No.: US 8,335,923 B2
(45) Date of Patent: Dec. 18, 2012

(54) METHOD FOR COMPATIBILITY CHECKING OF A MEASURING SYSTEM COMPRISING A MEASUREMENT TRANSMITTER AND A SENSOR

(75) Inventors: Detlev Wittmer, Maulbronn (DE); Reinhard Weiss, Leonberg (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 220 days.

(21) Appl. No.: 12/733,281

(22) PCT Filed: Aug. 8, 2008

(86) PCT No.: PCT/EP2008/060427
§ 371 (c)(1),
(2), (4) Date: May 6, 2010

(87) PCT Pub. No.: WO2009/024480
PCT Pub. Date: Feb. 26, 2009

(65) Prior Publication Data
US 2010/0287379 A1     Nov. 11, 2010

(30) Foreign Application Priority Data
Aug. 21, 2007   (DE) .................. 10 2007 039 530

(51) Int. Cl.
*G06F 21/00*     (2006.01)
(52) U.S. Cl. ........ 713/176; 713/179; 726/27; 73/114.73
(58) Field of Classification Search ................. None
See application file for complete search history.

(56) References Cited

U.S. PATENT DOCUMENTS

| | | | |
|---|---|---|---|
| 6,164,547 A * | 12/2000 | Vapaakoski et al. | 235/474 |
| 6,298,255 B1 * | 10/2001 | Cordero et al. | 600/372 |
| 2003/0105961 A1 | 6/2003 | Zatloukal | |
| 2005/0010782 A1 | 1/2005 | Ohkubo | |
| 2005/0049501 A1 | 3/2005 | Conero | |
| 2006/0068759 A1 * | 3/2006 | Ikebe et al. | 455/411 |
| 2006/0156415 A1 * | 7/2006 | Rubinstein et al. | 726/27 |
| 2006/0161054 A1 * | 7/2006 | Reuss et al. | 600/300 |
| 2007/0123316 A1 * | 5/2007 | Little | 455/573 |
| 2007/0135092 A1 | 6/2007 | Pieronek | |
| 2008/0004532 A1 * | 1/2008 | Rubey et al. | 600/476 |
| 2010/0045453 A1 * | 2/2010 | Orr et al. | 340/506 |

FOREIGN PATENT DOCUMENTS

| | | |
|---|---|---|
| DE | 295 13 552 U1 | 11/1995 |
| DE | 698 09 965 | 11/2003 |
| DE | 103 13 639 A1 | 10/2004 |
| DE | 10 2004 024 002 | 12/2005 |
| WO | WO 2006/073702 | 7/2006 |

* cited by examiner

*Primary Examiner* — Philip Chea
*Assistant Examiner* — Dorianne Alvarado David
(74) *Attorney, Agent, or Firm* — Bacon & Thomas, PLLC

(57) ABSTRACT

In a method for compatibility checking of a measuring system including a measurement transmitter and a sensor, a first signature is externally created for an identifying data set and is stored in the measurement transmitter. After transmission of the identifying data set from the measurement transmitter to the sensor, a second signature is calculated for the identifying data set in the sensor. If the signatures match, then the measurement transmitter and the sensor are compatible and the measurement transmitter can access data and/or functions of the sensor.

5 Claims, 5 Drawing Sheets

|  | Original Sensor | Licensed Measurement Transmitter |
|---|---|---|
| Starting Position | | |
| | knows:<br>• Private Key PK | knows:<br>• Identifying Data Set IDS<br>• Signature S1 |
| "Synchronization Phase" | | |
| Measurement Transmitter sends | ← | Identifying Data Set IDS |
| Sensor calculates | calculates Signature S1' | |
| Measurement Transmitter verifies Sensor | | |
| Measurement Transmitter sends | ← | "Measurement Transmitter Query" |
| Both calculate | Calculates response to Measurement Transmitter Query | Calculates expected response to Measurement Transmitter Query |
| Sensor sends | Response to Measurement Transmitter Query | → |
| Measurement Transmitter decides | | Does response match expected response?<br>• If yes: OK<br>• If no: Error |
| Sensor verifies Measurement Transmitter | | |
| Sensor sends | "Sensor Query" | → |
| Both calculate | Calculates expected response to Sensor Query | Calculates response to Sensor Query |
| Measurement Transmitter sends | ← | Response to Sensor Query |
| Sensor decides | Does response match expected response?<br>• If yes: OK<br>• If no: Error | |

Fig. 2

| | Sensor | Measurement Transmitter |
|---|---|---|
| Basic Information | | |
| Data | • Secret Key $y_c$ | • Measurement Transmitter Data Set $x_t$ |
| | | • Certificate $z_t$ |
| Algorithms | • Algorithm for $f_1$ | • Algorithm for $f_1$ |
| | • Algorithm for $f_2$ | |
| Execution | | |
| Measurement Transmitter calculates | | • Ascertaining a random value for $x_t$ |
| Measurement Transmit. sends | $x_t, x_c$ ⬅ | $x_t, x_c$ |
| Both calculate | • $z_c = f_1(x_c, y_c)$ | • $\tilde{z}_t = f_1(x_t, z_t)$ |
| | • $z_t = f_2(x_t, z_c)$ | |
| Sensor Head sends | $z_t$ ➡ | $z_t$ |
| Measurement Transmitter calculates | | $z_t = \tilde{z}_t$ → Sensor verified |
| | | $z_t \neq \tilde{z}_t$ → Sensor not verified |
| End | | |

Fig. 3

| | Sensor | Measurement Transmitter |
|---|---|---|
| Basic Information | | |
| Data | • Private Key $y_c$ | • Identifying Data Set $x_c$ |
| | | • Signature $z_i$ |
| Algorithms | • Algorithm for $f_c$ | • Algorithm for $f_i$ |
| | • Algorithm for $f_i$ | |
| Ablauf | | |
| Measurement Transmit. sends | $x_c$ ← | $x_c$ |
| Sensor Head calculates | • $z_c = f_c(x_c, y_c)$ | |
| Sensor Head calculates | • Ascertaining a random value for $x_i$ | |
| Sensor head sends | $x_i$ → | $x_i$ |
| Both calculate | • $\bar{z}_i = f_i(x_i, z_c)$ | • $z_i = f_i(x_i, z_c)$ |
| Measurement Transmit. sends | $z_i$ ← | $z_i$ |
| Sensor Head calculates | $z_i = \bar{z}_i$ → Measurement Transmitter verified | |
| | $z_i \neq \bar{z}_i$ → Measurement Transmitter not verified | |
| End | | |

Fig. 4

METHOD FOR COMPATIBILITY CHECKING OF A MEASURING SYSTEM COMPRISING A MEASUREMENT TRANSMITTER AND A SENSOR

TECHNICAL FIELD

The invention relates to a method for compatibility checking of a measuring system comprising a measurement transmitter and a sensor.

BACKGROUND DISCUSSION

In process automation technology, measuring systems are often applied, which comprise a measurement transmitter and a sensor. The sensor serves for registering a chemical/physical, measured variable, which is either represented in the measurement transmitter after a further processing, or forwarded to the process control/process display.

Communication between the sensor and the measurement transmitter can be analog or digital.

In the following, only measuring systems having digital communication between the sensor and the measurement transmitter will be considered.

An example of such a digitally communicating measuring system combines the product, LIQUILINE®, as the measurement transmitter and the product, MEMOSENS®, as the sensor. Both products are manufactured and sold by Endress+Hauser.

In the case of commercially successful measuring systems, their manufacturers frequently desire to enter into ventures, in which the measuring system of concern, or components thereof, e.g. the measurement transmitter or the sensor, is/are produced under license.

In such case, it must, however, be assured, that both original components manufactured by the manufacturer of the measuring system as licensor, as well as also licensed components manufactured by the licensee, are compatible with one another and work together without problem.

Moreover, it should be prevented, that unauthorized infringers bring to market sensors or measurement transmitters, which work with the original components, or with the licensed components, without problem.

SUMMARY OF THE INVENTION

An object of the invention is to provide a method for compatibility checking of a measuring system composed of a measurement transmitter and a sensor, wherein it is assured, that only original components, or licensed components, of measurement transmitters, or sensors, work together without problem.

This object is achieved by transmitting the identifying data set from the measurement transmitter to the sensor; calculating a second signature for the identifying data set in the sensor with the assistance of a signing algorithm; checking in the sensor, whether the first signature matches the second signature; checking in the measurement transmitter, whether the second signature matches the first signature; if the two signatures match, the measurement transmitter and the sensor are compatible and the measurement transmitter can access data and/or functions of the sensor.

An essential idea of the invention is to store in the measurement transmitter an identifying data set and a first signature for this identifying data set and to calculate in the sensor with a signing algorithm a second signature for the identifying data set and to compare the signatures with one another. In such case, both in the sensor, as well as also in the measurement transmitter, it is checked, whether the signature of the other components matches the manufacturer's signature.

Only when the two signatures, in each case, match, is it assured that both the first signature, as well as also the signature algorithm come from the licensor and, thus, that, in the case of the measurement transmitter and, respectively, in the case of the sensor, original components or licensed components are involved and, therewith, the measurement transmitter and the sensor are compatible. In this case, the measurement transmitter can access data and/or functionalities of the sensor.

Before calculating the first signature, the identifying data set must naturally be transmitted into the sensor.

The licensor would like naturally to be able to assign different access rights. Therefore, in a further development of the invention, there is contained in the identifying data set an authorization key, which establishes access rights.

The licensor would like to grant a license for individual, licensed components. Therefore, it is provided in a further development, that the identifying data set includes an identification identifying the measurement transmitter (e.g. manufacturer code, serial number).

In order to assure the security of the signing algorithm, in a further development of the invention, in the comparison of the signatures, the signatures are transmitted not in cleartext, but, rather, in each case, only in the form of values won from one-way functions.

For additional security of the signing algorithm, according to a further development of the invention, the signing algorithm in the sensor is protected against read out.

In order to assure backwards compatibility with older measurement transmitters, or older sensors, according to a further development of the invention, when the two signatures do not match, minimum authorizations are granted.

If misuse of the signing algorithm by an unauthorized manufacturer is detected, then, according to a further development of the invention, the manufacturer code of such manufacturer is, from then on, placed in the identifying data set of measurement transmitters manufactured.

BRIEF DESCRIPTION OF THE DRAWINGS

The invention will now be explained in greater detail on the basis of an example of an embodiment illustrated in the drawing, the figures of which show as follows:

FIG. 2 is a table with essential method steps;

FIG. 3 is a table for verification of the sensor;

FIG. 4 is a table for verification of the measurement transmitter; and

DETAILED DISCUSSION IN CONJUNCTION WITH THE DRAWINGS

Figure 1:
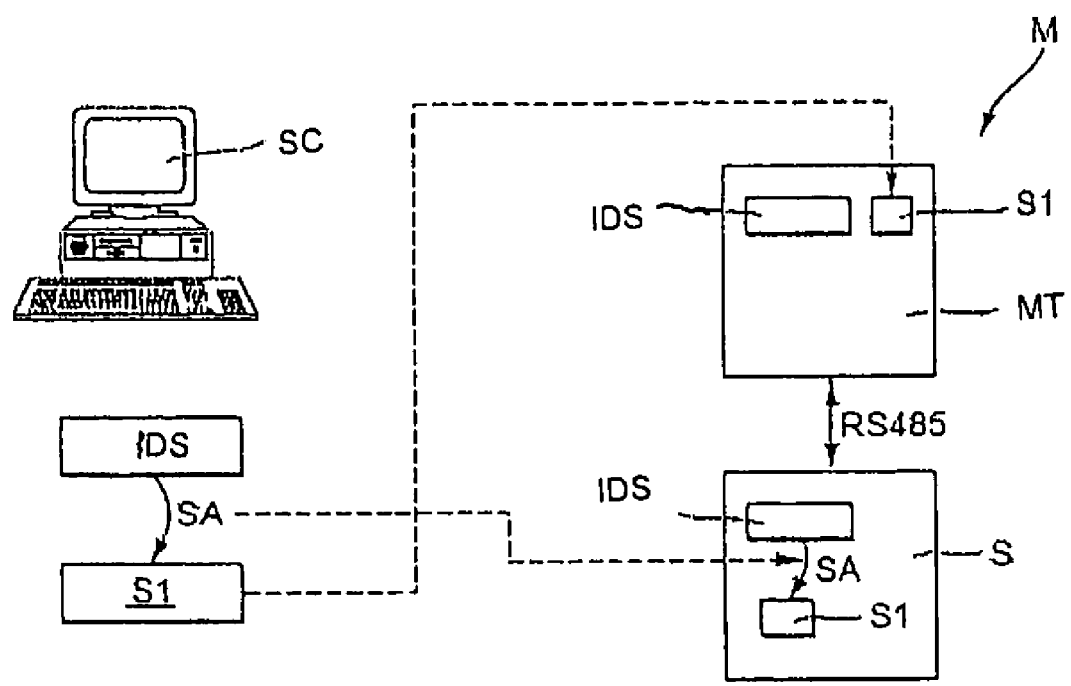
FIG. 1 is a measuring system with a signature calculator, in schematic representation.

The measuring system M shown in FIG. 1 comprises a sensor S and a measurement transmitter MT, which exchange data via a communication connection.

In the illustrated case, an RS485 cable connection is being used. Other options include a wireless connection.

The sensor S can be e.g. a pH sensor, a conductivity sensor or an oxygen sensor. In the measurement transmitter MT, a further processing of the measured variable registered by the sensor occurs. The measurement transmitter MT serves for representing the measured value and can forward such e.g. via a fieldbus.

The measuring system M is, in principle, constructed as a measuring point composed of the products, LIQUILINE® and MEMOSENS®, of the assignee. According to the invention, however, certain adaptations must occur.

Beside the measuring system M is shown a signature calculator SC in the form of a computer. The signature calculator is located at the licensor. The signing algorithm SA and the private key PK applied in the case of this algorithm are known only by the licensor.

The licensee informs the licensor of characteristic data, such as serial number and the desired functionalities, for the measurement transmitter MT to be licensed. On the basis of this data, an identifying data set IDS is composed, which contains the manufacturer code of the licensee, the serial number of the measurement transmitter and an authorization key AK.

This identifying data set IDS is signed with the signing algorithm SA. In such case, with a private key PK, a signature S1 is produced.

The identifying data set IDS is transmitted together with the signature S1 to the licensee. The licensee stores these two categories of information in the measurement transmitter having the relevant serial number. In this way, the measurement transmitter MT becomes a licensed measurement transmitter.

In the case of a licensed sensor S, the signing algorithm SA, which comprises the private key PK, is stored.

The sensor information is protected against a read-out by storing it in a memory (FLASH-memory), which is integrated on a microchip with a microcontroller.

The method of the invention will now be described in greater detail on the basis of a licensed measurement transmitter and a licensed sensor.

As already mentioned above, the identifying data set IDS and the first signature S1 are stored in the measurement transmitter MT. Stored in the sensor S is the signing algorithm SA.

After measurement transmitter MT and the sensor S have been connected with one another, the measuring system M is initialized. In such case, certain initialization routines are executed. For instance, among other things, parameters important for the communication between measurement transmitter MT and sensor S are exchanged.

During the initializing phase, also the compatibility checking occurs.

In a first method step a), the identifying data set IDS is transmitted from the measurement transmitter MT to the sensor S. Then, the identifying data set IDS is available in the sensor for further calculations. The first signature S1 is not transmitted.

In a method step b), a second signature S1' is produced in the sensor S for the identifying data set IDS. In such case, the signing algorithm SA stored in the sensor S is applied to the identifying data set IDS. As result, one obtains a second signature S1'.

In an additional method step c), there occurs in the sensor a checking whether the signature S1' ascertained in the sensor matches the signature S1. In such case, for the sake of security, the signature S1 is not transmitted in cleartext from the measurement transmitter MT to the sensor. Using an artful question, answer game, it can be detected in the sensor S, unequivocally, whether matching is present.

Therewith, the sensor S 'knows' that it is connected to a licensed, or original, measurement transmitter MT, since only such a measurement transmitter can contain the 'correct' signature S1 for the identifying data set IDS.

In the method step d), the equivalent checking occurs on the part of the measurement transmitter MT.

Also, here, it is checked, whether the signature S1 stored in the measurement transmitter MT matches the calculated signature S1'. Also here, for the sake of security, the signature S1' is not transmitted in cleartext from the sensor S to the measurement transmitter MT. Using an artful question, answer game, it can be detected in the measurement transmitter MT, unequivocally, whether matching is present.

Therewith, also the measurement transmitter MT 'knows' that a licensed, or original, sensor is connected to it, since only a licensed sensor S contains the same signature algorithm SA also used by the licensor.

If the signatures S1 and S1' match, it is assured, that the measurement transmitter MT and the sensor S are compatible. Therewith, the measurement transmitter MT can access data and/or functions of the sensor S.

Essential in the case of the method of the invention is that both on the part of the measurement transmitter, as well as also on the part of the sensor S, it is checked whether the connected component is a licensed, or original, component.

In FIG. 2, the essential elements of the method are combined in tabular form.

If one of the two components is not an authorized component, then the authorized component can determine this and therefore reject data exchange completely or permit such only in a limited measure.

In the sensor S, data can be queried via indices. Typically, 256 indices are provided. Through transmission of an authorization key AK having 256 bits, it can be established in the sensor which indices can be read by the measurement transmitter MT and which cannot.

In simple manner, the value 0 in the authorization key AK means the corresponding index cannot be read. In the case of the value 1, a read is possible. The granting of writing rights can be handled in corresponding manner. The value 0 means only writing rights, while the value 1 means read, and write, rights. If the authorization key is in two parts, each with 256 bits, then the two key portions can be added in the sensor. A value 0 in the resulting index means no read, and no write, rights, the value 1 means only read rights and the value 2 means read, and write, rights.

Via the authorization key AK, the licensor can establish, which authorizations the licensee obtains for the particular measurement transmitter. Since the authorization key AK is taken into consideration in the signing algorithm, manipulation is not possible, since this would automatically lead in the calculating of the signature S1' to a result differing from the signature S1.

Since the identifying data set IDS includes the manufacturer code of the licensee and the serial number S/N of the measurement transmitter MT, licenses for individual measurement transmitters can be granted.

Next, the signing algorithm SA will be explained in greater detail.

Let $f:\{0,\ldots,2^n-1\}\times\{0,\ldots,2^o-1\}\to\{0,\ldots,2^m-1\}$ be a calculable, one-way function. Knowledge of the function f is used in the following synonymously with knowledge of the algorithm for calculating f(x,y) in the case of presence of x and y. In this case, n is the size of the input data (in bits),
o is the size of the key (in bits),
m is the size of the output data (in bits),
x is the identifying data set IDS,
y is the private key PK, and f(x,y) is the output data of the function.

The algorithm for calculating the function $f$ must be so designed that, as regards the capacities available in the sensor S, such as flash memory, RAM-memory and CPU time, it is performable during the initializing phase with the protocol for data exchange between sensor S and measurement transmitter MT. A possible protocol for this data exchange is the MEMOSENS® protocol the firm, Endress+Hauser.

The function f(x,y) can be defined as a one-way function via a cryptographic, hash function, $$f_c(x,y)=h(2^p \cdot x+y).$$

The signatures S1 and S1' are calculated as follows: S1=h $(2^p \cdot x+y)$ und S1'=h $(2^p \cdot x+y)$.

In order, in the case of the checking according to the method steps c) and d) of the signatures, not to have to transmit in cleartext, likewise one-way functions $f_t$ and $f_s$, respectively, can be used.

How this occurs, is presented tabularly in the figures, FIG. 3 for the verification of the sensor, and FIG. 4 for the verification of the measurement transmitter. Since formulas were used in these two tables, some reference characters had to be adapted. The subscript t stands for the measurement transmitter (transmitter); the subscript s stands for the sensor.

In order to lessen the memory requirement in the sensor, the same algorithm can be used for all three functions $f_c$, $f_t$ und $f_s$.

Stored in the sensor S are methods, which enable a reading and writing of data of the sensor S. The access rights for these data are externally established. There are no methods provided, which enable an unlocking of data.

Also provided in the sensor S is a boot loader for updates of the sensor firmware. This boot loader contains the private key PK, which is to be protected with suitable measures against read-out. Therewith, the private key PK need not be contained in the firmware updates. Also, firmware updates should be protected against tampering.

An opportunity is to encrypt, and therewith to sign, the checksum of the firmware with the private key PK.

In order to prevent read-out of the firmware of the measurement transmitter MT, it is provided, that the licensor delivers to the licensee a chip for the measurement transmitter, which possesses a microcontroller and an on-board flash memory. Via the activating of a security mechanism in the microcontroller, read-out of the flash memories can be prevented. Also stored on this chip is the communication protocol. A measurement transmitter manufacturer must then only integrate such chips into its measurement transmitters, in order to make the measurement transmitters compatible.

Figure 5:
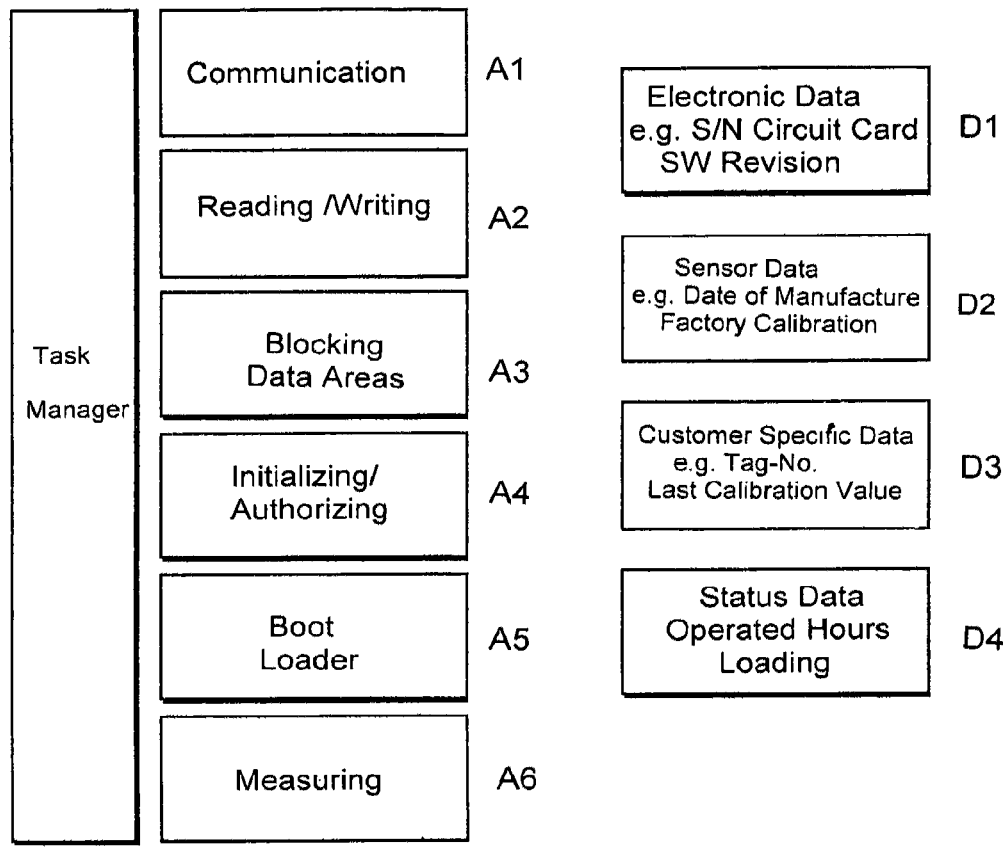
FIG. 5 is a software structure of a sensor.

FIG. 5 shows schematically the software-structure of a sensor S with various functions and various data sets. A task manager cares for having the individual program tasks A1-A6 be timely processed with the appropriate priority.

The function, 'communication', is responsible for the protocol-correct performance of the data exchange between sensor S and measurement transmitter MT.

The sensor data are divided into four data blocks D1-D4. Especially for these data blocks, it makes sense to grant different rights.

The invention is suited especially for two-part, pH-, redox-, or conductivity sensors, such as are applied in analytical technology. Such sensors are composed of a consumable electrode and a plug head with cable, which serves for connection to the measurement transmitter. Data transmission between consumable electrode and plug head occurs via an inductive data transmission link. Such sensors are sold by the assignee under the mark, MEMOSENS®.

The invention claimed is:

1. A method for compatibility checking of a measuring system comprising a measurement transmitter and a sensor, which exchange data via a communication connection, wherein an identifying data set and a first signature for the identifying data set are stored in the measurement transmitter, and wherein the identifying data set includes an authorization key, which enables access to data and/or functionalities of the sensor, comprising the steps of:
   transmitting the identifying data set from the measurement transmitter to the sensor;
   calculating a second signature for the identifying data set in the sensor with the assistance of a signing algorithm;
   transmitting of the first signature not in cleartext from the measurement transmitter to the sensor and checking in the sensor, whether the first signature matches the second signature by using a question and answer game;
   transmitting of the second signature not in cleartext from the sensor to the measurement transmitter and checking in the measurement transmitter, whether the second signature matches the first signature by using a question and answer game;
   if the two signatures match, the measurement transmitter and the sensor are compatible and the measurement transmitter can access data and/or functions of the sensor,
   wherein the sensor consists of one of a group of pH sensors, conductivity sensors and oxygen sensors.

2. The method as claimed in claim 1, wherein:
   the identifying data set contains data, which uniquely characterize a measurement transmitter.

3. The method as claimed in claim 1, wherein:
   in the case of the checking, whether the two signatures match, the two signatures, respectively, are not exchanged in cleartext, but, instead, via values associated with one-way functions.

4. The method as claimed in claim 1, wherein:
   the signing algorithm in the sensor is stored in such a manner, that it is protected against read-out.

5. The method as claimed in claim 1, wherein:
   when the two signatures do not match, minimum authorizations for data access are granted.

* * * * *